Dec. 7, 1948. J. M. KUDER 2,455,782
METHOD OF MAKING CITRUS WASTE FEED PRODUCTS
Filed Oct. 11, 1946
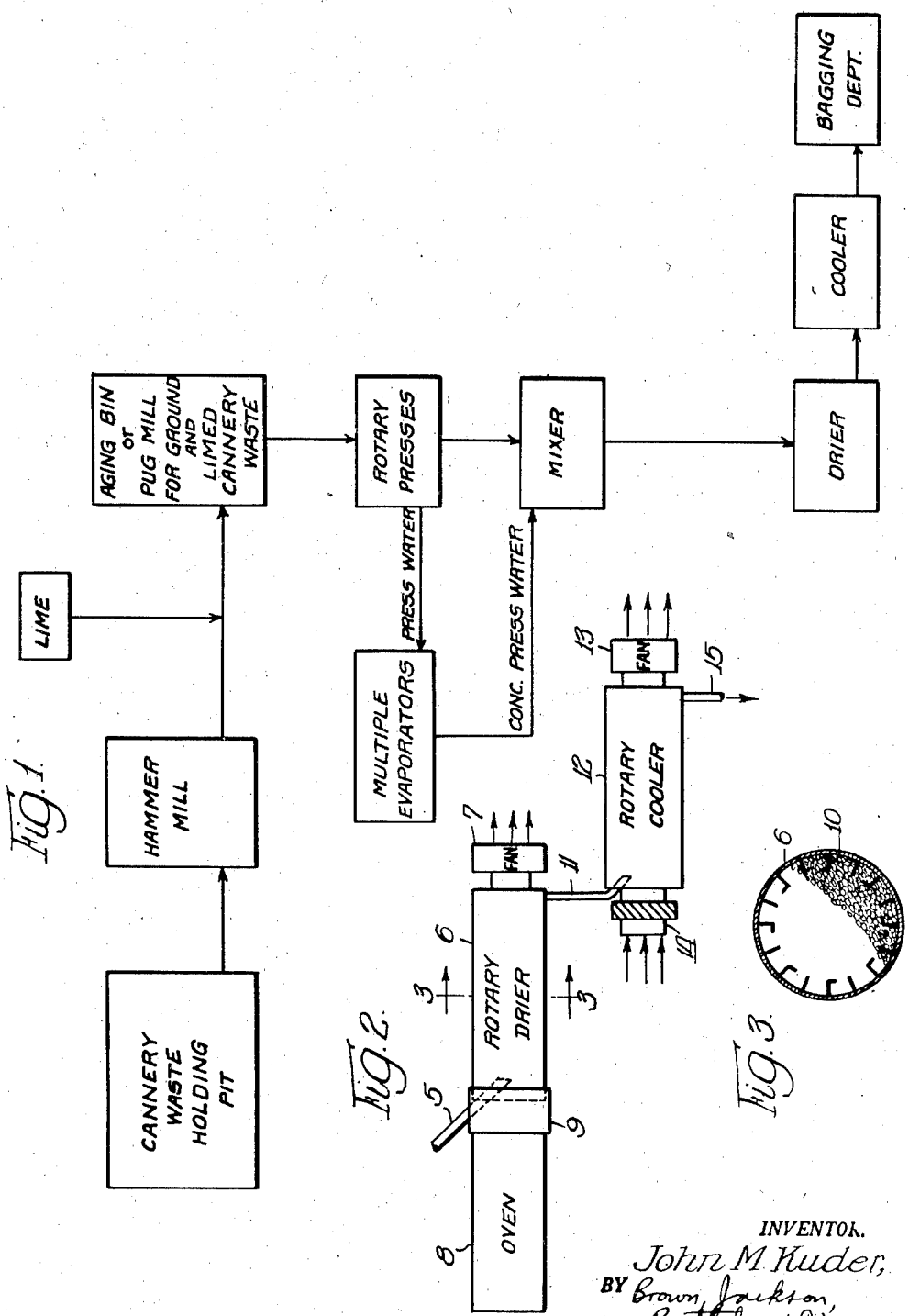
INVENTOR.
John M. Kuder,
BY Brown, Jackson,
Boettcher & Dienner Patented Dec. 7, 1948

2,455,782

UNITED STATES PATENT OFFICE 2,455,782

METHOD OF MAKING CITRUS WASTE FEED PRODUCTS

John M. Kuder, Winter Haven, Fla.

Application October 11, 1946, Serial No. 702,649

5 Claims. (Cl. 99—2)

My invention relates, generally, to the conversion of citrus cannery waste into stock feed and fertilizer products, and it has particular relation to a process of converting such cannery waste wherein the feed or fertilizer products produced contain all of the nutritive content or value of the cannery waste and there are no objectionable by-products to be disposed of.

Canning of citrus fruit juices has become a large industry within recent years. The canning factories are, for the most part, located in the citrus fruit districts, such as in Florida, California and Texas. Although oranges and grapefruit constitute the large bulk of the citrus fruit going to these canning factories, the juices from tangerines, lemons and limes are also canned on a smaller scale.

The citrus fruit canning industry necessarily produces a large amount of so-called cannery waste. This includes what remains of the citrus fruit after the juice has been squeezed or extracted therefrom. The waste includes the peel, seed, rag and pulp. This material will be hereinafter collectively referred to as cannery waste. This cannery waste constitutes about 60% by weight of the ripe fruit, and during the 1945-46 canning season in Florida approximately 1,000,000 tons of cannery waste was produced.

These immense amounts of cannery waste, obviously, present a serious disposal problem in a state such as Florida where the citrus industry is the first ranking industry. The cannery waste contains substantial amounts of sugar and other fermentable carbohydrates, as well as proteins, which are subject to decay. Piles of the cannery waste when left in the open to rot, soon give off a stench and serve as an ideal breeding place for flies, maggots and other insects, thereby constituting a health hazard and offensive nuisance. Since the canning factories are necessarily located in the centers of the citrus districts, which are part of the vacation-land and resort areas in a state such as Florida, naturally these large quantities of cannery wastes cannot be dumped and left to deteriorate by natural spoilage processes. Aside from the standpoint of health hazards, a large part of the wealth and income in the state is dependent on tourists and vacationists, and the authorities and property owners will not tolerate any nuisance prejudicial to the beauty and attractiveness of the state.

Although the cannery waste contains large amounts of nutritive constituents including sugars, minerals, fats, proteins, and other carbohydrates, which would be valuable in stock feed and fertilizers, the cannery waste, as such, is not in such a form that these values can be taken advantage of to any material extent because the cannery waste does not have keeping qualities and is not adapted to be shipped. Hence, the problem is presented of converting the cannery waste into acceptable stock feed and fertilizers on an economical basis, so that it can be marketed the year around.

As the cannery waste comes from the canning factories, water constitutes about 85-90% of its composition, while only 10-15% is solid matter. In order to be converted into suitable stock feed and fertilizers, the large bulk of this water content must be removed. Although this water can be reduced to a suitable figure by direct drying of the waste, fuel costs are such as to prohibit such drying operations on any large scale.

Some progress has already been made in solving this problem and a large citrus feed and fertilizer industry has been built up for converting cannery waste into stock feed and fertilizer products. At the present time the cannery waste is passed through a hammer mill or shredder wherein the waste is comminuted. The comminuted material is conditioned for pressing by the addition of a suitable known material, such as lime. As a result of the chemical reactions taking place during the aging process, involving breaking down of the pectins and cell structure, the waste is brought into such a condition that it is possible to press out a considerable fraction of the water content. During the pressing operation, the resultant press water which is eliminated, unavoidably carries along with it a very substantial proportion of the soluble sugar content of the cannery waste, as well as considerable amounts of other of the nutritive constituents. The resulting press cake is dried down to a low water content—say in the order of 9% to 10% by weight—and is then in a condition suitable for bagging and sale as stock feed.

However, for each hundred pounds of dry feed thus produced, the pressing operation has removed from 230 to 280 pounds of water from the limed cannery waste. This amount of press water contains, on the average, about 17.5 pounds of sugar and about 8 pounds of other valuable nutrients, including sugars, proteins, pectin, minerals and vitamins. The press water thus, not only results in a loss of valuable nutrients which would greatly improve the value of the stock feed and fertilizer, but, in addition, the press water presents a serious disposal problem in that it is subject to fermentation and decay, so as to result in obnoxious odors and create health hazards of many sorts. In such places as Florida, for example, the press water cannot be discharged into waste wells or streams without causing pollution of the water systems and streams for miles around, and such practice has been held to be illegal. As a matter of fact, instances now exist where such press water has been previously discharged into deep waste wells and a serious pollution problem remains, even though the use of such waste wells has been discontinued for several years. One of the biggest pollution problems which has persisted in connection with such waste wells has been the generation of methane gas, which cannot be cleared up in a short period of time or at small expense.

Having regard to the existing situation regarding the disposal of cannery waste, as outlined above, the object of my invention, generally stated, is the provision of an economical process of converting cannery waste into marketable animal feed and fertilizer wherein substantially all of the nutritive constituents of the cannery waste are preserved along with the other solid matter and no objectionable by-products result which require separate disposal. The process must of course be so feasible that it is commercially practical.

An important object of the invention is the provision of a method of handling the press water from cannery waste by concentrating it to a particular range of solids content, whereby it may be so absorbed in the press cake as to yield a mass which can be conveniently and economically dried to a feed or fertilizer product capable of being bagged and distributed in commercial channels without deterioration.

Certain other objects of the invention will be more fully apparent and appreciated in view of the following detailed description of what is now regarded as the best method of practicing my invention.

For a more complete understanding of the nature and scope of the invention, reference may now be had to the following detailed description thereof taken in connection with the accompanying drawing, wherein:

Figure 1 is a flow diagram of the process of converting cannery waste into stock feed or fertilizer in accordance with the present invention;

Figure 2 is a diagrammatic showing of a drier and cooler combination suitable for use with the process of the invention; and Figure 3 is a sectional view taken on line 3-3 of Figure 2.

As shown in the flow diagram in Figure 1, the cannery waste supply is held in a holding pit from which it is delivered to a hammer mill, or other suitable equipment, for comminuting or shredding. From the hammer mill, the wet, sloppy material is transferred to an aging bin or pug mill for holding ground and limed cannery waste. Lime is added to the ground cannery waste before it is delivered into the aging bin or pug mill. The lime is added in such an amount as to equal about 0.3% by weight of the cannery waste, the exact amount depending upon the acidity and pectin content of such waste.

The material is allowed to set and age in the aging bin for a short period, during which chemical reactions are set up freeing a substantial proportion of the water content from the pulpy mass, and permitting this water to be conveniently pressed out, as can readily be determined by squeezing in the hand a small amount of the conditioned pulp.

After aging, the ground and limed cannery waste is fed into continuous mechanical presses as indicated, wherein from 230 to 280 pounds of water is pressed out from about each 590 pounds of material fed into the presses. The press cake may be left with from 65 to 75% by weight of water. The press water is concentrated to a point where it has a solids content of from 35 to 55%. The original concentration of solids in the press water was about 8 to 11%. I prefer to concentrate the press water to that point where it has approximately 40 to 45% solids content. Multiple effect evaporators can be used for carrying out the concentrating process.

The concentrated press water is then mixed or blended with the broken press cake in a continuous mechanical mixer which may be of any suitable type. In mixing, the concentrated press water should be heated to about 180° F. and the press cake should be warmed to approximately 100° F. It may be desirable to steam the press cake to promote the mixing operation. The rate of flow of the concentrated press water into the mixer is such that all of the original solids and nutritive material which have been pressed out with the press water are returned. That is, all of the concentrated press water is added to the cake, thereby retaining all of the original ingredients of the cannery waste.

The resultant mixture will have about 2% or 3% less moisture content than the original press cake. That is the resultant mixture will have a moisture content of about 62 to 72%. This decreased moisture content of the mixed material is very important from the cost standpoint. In comparison with current practice where the press cake is dried without additional material, more water has to be removed in the driers per pound of dried product obtained than is required under the process of the present invention. The mixed material is transferred to hot air driers of the rotary type wherein the mixed material is dried so as to have a water content of about 9%. The mixed mass going into the driers is flaky in the hand and will cascade and break up in the rotary driers with practically no tendency to ball or cake up therein.

From the driers, the material is passed to a cooler where its temperature is reduced to atmospheric, or slightly above atmospheric temperature, and then the material is bagged for shipping.

Reference may now be had to Figures 2 and 3 of the drawings for a more detailed description of drying and cooling equipment which has been found to be very satisfactory in producing a product which is adequately non-hygroscopic, is very bulky, and has a good feed color. From the mixer, the mixed material is fed through a chute 5 into one end of a rotary drier 6. An exhaust fan 7 is connected with the other end of the drier 6 and serves to draw large volumes of hot air and gases from the oven 8, through the body of the drier 6, as indicated by the flow arrows. The oven 8 may be fired with fuel oil or other available and inexpensive fuel. The hot gases may have a temperature of approximately 1500° F. as they enter the drier 6.

The oven 8 is stationary and a cylindrical cowl 9 is fitted to the outlet end thereof, as shown, so as to enclose the open space separating the oven from the drier 6.

The drier 6 rotates in a counterclockwise direction and is provided on the inside with flights or ribs 10 which extend the length thereof. Some of the flights are angle-shaped while others are not. The flights 10 catch the pieces of wet material when they are in the bottom position and then carry them up until they fall, as illustrated in Figure 3. In this manner the wet material cascades and breaks up while being dried by the hot gases drawn therethrough.

The dried material having a moisture content of about 9% and at a temperature of about 160–180° F. is discharged from the drier through a discharge chute 11 connecting with a rotary cooler 12. The drying action serves to produce a desirably browned material without loss or destruction of nutritional constituents.

The rotary cooler 12 is provided with an exhaust fan 13 which draws large volumes of cooling air therethrough, as indicated by the flow arrows. In order to make the air as cool as possible, a humidifier 14 is disposed in front of the cooler 12 wherein the air picks up water vapor, and in so doing, is cooled. The cooler 12 is of the rotary type and is similar to the drier 6. It has internal flights which serve to stir and cascade the dried material. The cooled material is discharged from the cooler 12 through a discharge chute 15 at a temperature of about 80–100° F. and is suitable for bagging and shipping.

The resultant feed and/or fertilizer product is light brown or golden brown in color; in other words, a good feed color. It is exceedingly bulky, which is very desirable for beef and dairy cattle feed, and is sufficiently non-hygroscopic so that it may be bagged, handled, shipped and stored in warm, humid climates without spoilage or molding. That is, it can be handled in regular commercial feed or fertilizer distribution channels without requiring special handling or storing precautions.

A critical and essential feature of my process is the concentrating of the press water to the range of solids content specified above. It appears that when the solids content of the concentrated press water is about 45% by weight, the solids will readily disperse and be uniformly absorbed in the warm pieces or particles of press cake material, yielding a flaky type of material. If the solids content is much higher, the mixing will not be satisfactory and a gummy, gooey mass will result which cannot be properly or efficiently dried, when all of the concentrate is added back to the press cake. Furthermore, even when dried, the product is too hygroscopic to be satisfactorily stored and handled.

On the other hand, if the concentrated press water is added back at less than 35% solids content, the costs are materially increased and the resultant product lacks bulkiness and flakiness, and will be a materially inferior product.

Of course, from the standpoint of fuel efficiency, as much water should be evaporated from the press water as possible. However, the normal tendency toward concentrating the press water to a much greater solids content than 45% must be avoided in the successful operation of the present process.

The advantages of the present process over the current practice of separately disposing of the press water are very important. A most important advantage is the fact that with the present process there is no objectionable by-product to be disposed of. An equally important advantage is that the resultant feed contains all of the solids and nutrient constituents of the cannery waste. The sugars and other valuable nutrients contributed to the final product by the concentrated press water (which ingredients were formely separately disposed of) add greatly to the food value of the resultant feed and make the feed much more palatable, digestible and nutritious.

The following specific example serves to illustrate the process of the present invention:

590 pounds of ground, limed and aged cannery waste, having an 83% moisture content, was pressed to a cake having a 70.5% moisture content. 250 pounds of press water were obtained having a 9% solids content, or a total of 22.5 pounds of dissolved and suspended solids. The press water was evaporated to about a 45% solids content, and in so doing about 200 pounds of water were evaporated, leaving a 50 pound concentrate (about 5 gallons). The concentrate was returned in its entirety to the press cake which weighed about 340 pounds. After thorough mixing of the concentrated press water with the press cake, a mass of flaky, easily breakable, material was formed having a moisture content of 68%. When this mass was dried to a moisture content of about 9%, a product containing 122.5 pounds dry solids was obtained.

Under present practice, wherein the press water is separately disposed of, 590 pounds of such ground, limed and aged cannery waste yields approximately 100 pounds of dried feed product. Whereas, in accordance with the present invention, the same amount of cannery waste yields approximately 122 pounds of dried feed product, an increase in yield of about 22%. In addition, the increase in yield of 22 pounds represents substances of high nutritive value which are now retained in my process.

The process of my invention may, in certain of its aspects, be applicable to materials other than citrus fruit waste and certain of the appended claims are drawn accordingly.

Having fully described my invention, and set forth the best method of practicing the same, what I claim as new is:

1. In the process of converting citrus waste into feed and fertilizer products wherein the waste is pressed, and the resultant press cake is dried, the improvement, which comprises, concentrating all of the press water to a solids content within the range of from 35–55%, mixing all of the thus concentrated press water with said press cake prior to drying thereby forming a non-sticky, flaky mixture, and drying the resultant mixture to obtain a non-hygroscopic feed and fertilizer product containing substantially all of the nutritive value of said citrus waste.

2. The invention as called for in claim 1 wherein the press water is concentrated to a solids content of about 45%.

3. The invention as called for in claim 1 wherein the concentrated press water is heated to a temperature of at least about 150° F. prior to mixing with the press cake.

4. The invention as called for in claim 1 wherein said press cake is warmed to at least about 100° F. and said concentrated press water is heated to a temperature of at least about 150° F. prior to mixing with said warmed press cake.

5. In the process of converting citrus cannery waste into feed and fertilizer products wherein the cannery waste is pressed so as to yield a press cake having a water content of from about 65 to 75%, and the press cake is thereafter dried, the improvement which resides in: concentrating all of the press water to a solids content of about 40–45%, heating the concentrated press water to a temperature of at least about 150° F. mixing all of the heated concentrated press water with the press cake warmed to a temperature of at least 100° F. so as to yield a flaky mass having a water content of from about 62 to 72%, drying said flaky mass by direct contact with hot gases at a temperature of initially at least about 1500° F. down to a moisture content of from about 7 to 14%, and immediately thereafter cooling the dried material to a temperature not more than slightly above atmospheric thereby providing a non-hygroscopic dry feed and fertilizer product containing essentially all of the nutritive value of said citrus cannery waste.

JOHN M. KUDER.

REFERENCES CITED

The following references are of record in the file of this patent:

UNITED STATES PATENTS

| Number | Name | Date |
|---|---|---|
| 2,165,950 | Wilkie et al. | July 11, 1939 |
| 2,215,944 | Vincent | Sept. 24, 1940 |
| 2,225,428 | Christensen | Dec. 17, 1940 |
| 2,261,922 | Pittman et al. | Nov. 4, 1941 |
| 2,362,014 | Lissauer et al. | Nov. 7, 1944 |